May 9, 1950     F. L. TOWNSEND     2,507,125
COMBINATION FULL FLOW AND BY-PASS FILTER
Filed July 6, 1946
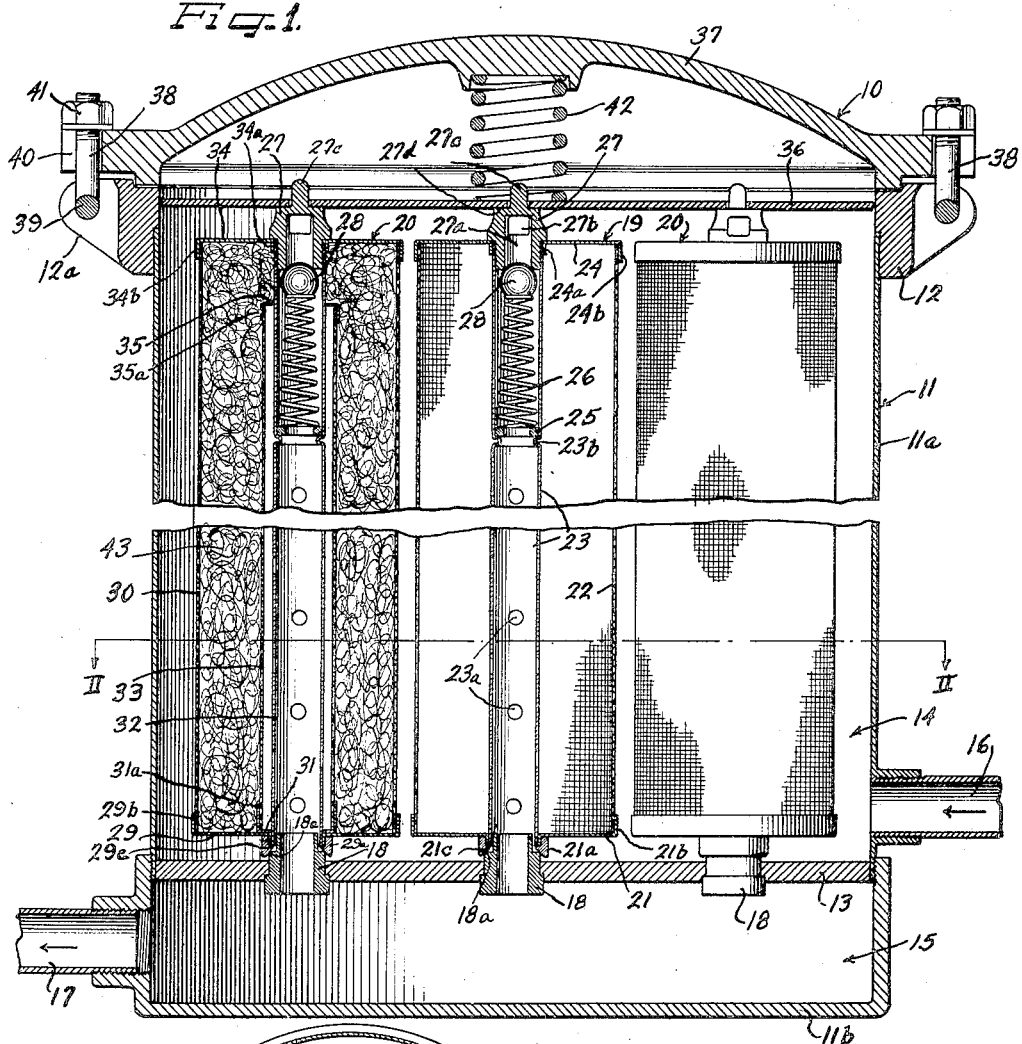
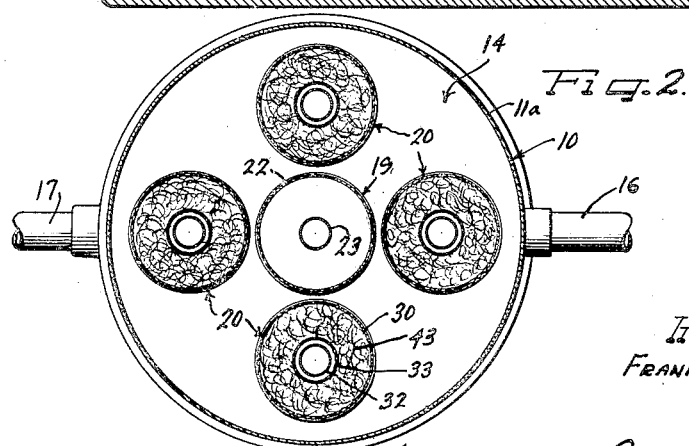
Inventor
Frank Lee Townsend Patented May 9, 1950

2,507,125

UNITED STATES PATENT OFFICE 2,507,125

COMBINATION FULL FLOW AND BY-PASS FILTER

Frank Lee Townsend, Chicago, Ill.

Application July 6, 1946, Serial No. 681,642

6 Claims. (Cl. 210—184)

This invention relates to a combined screen and absorbent filter assembly for simultaneously filtering and drying one portion of fluids fed thereto while screening the remaining portion. Specifically, the invention deals with a screen and filter unit especially adapted for lubricating oil systems of engines such as Diesel engines wherein some of the fluid is screened while the remaining portions of the fluid are simultaneously filtered and wherein flow of fluid through the unit is insured even in the event of total clogging of the filters and screen.

The invention will be specifically described as embodied in a combination full flow and by-pass filter unit for filtering crankcase oil in the lubricating system of a Diesel engine such as a locomotive Diesel. It should be understood, however, that the unit of this invention is generally adapted for screening and filtering fluids and is not limited to any particular usage.

Heretofore oil from the crankcase of a Diesel engine was pumped through a screen or sieve having an absorbent filter by-pass. About one-third of the oil was treated in the absorbent filter by-pass to dehydrate the oil and filter out fine slimes or sludges that would not ordinarily be removed by the screen. The remaining two-thirds of the oil was only screened. In this arrangement separate filter and screen units had to be provided with separate connecting tubing. At best only one-third or less of the oil was actually filtered and dehydrated. This dehydration of the oil is important to prevent development of corroding acids in the oil due to the presence of sulfur compounds which might form sulfurous acid in the presence of water.

According to the present invention, a single unit is provided to replace the heretofore used separate screen and filter by-pass units. The single unit of this invention is composed of a container having a false bottom dividing the container interior into a main top compartment and a bottom outlet compartment. Upstanding tube stubs or nipples are carried by the false bottom in the main compartment. One of these nipples or stubs receives the center perforated tube of a screen cartridge therearound. The other nipples or stubs receive the center perforated tubes of filter cartridges therearound. The filter cartridges have inner and outer screen cylinders with absorbent cotton or the like therebetween. The upstanding perforated tubes of the cartridges each have a relief valve therein adapted to directly vent the interior of the tube with the main compartment of the container whenever pressure in the main compartment exceeds a predetermined amount.

Oil from an engine crankcase or the like is introduced into the main compartment of the container to fill this compartment. The oil is pressured by means of a circulating pump and will filter through the screen and filter cartridges into the upstanding perforated tubes for drainage through the false bottom into the bottom compartment and thence out of the container.

The screen of the screen cartridge has a mesh selected to impart the same resistance to flow as the filter cartridges so that the oil will simultaneously pass through all cartridges.

The relief valves are spring pressed to closed positions under loads which will be exceeded whenever the screen and filters become clogged. The relief valves can conveniently be set to open at pressures in excess of 20 lbs. per square inch.

It is then an object of this invention to provide a single unit which will simultaneously screen one portion of fluid fed thereto while filtering the remaining portion of the fluid.

A still further object of the invention is to provide a single unit for screening and filtering fluid without danger of stopping circulation of the fluid even in the event of total clogging of the unit.

Another object of the invention is to provide a combination full flow and by-pass filter unit especially adapted for lubricating oil systems of engines and capable of handling hot oil from the engine crankcase.

Another specific object of the invention is to provide a filter unit composed of a single container housing screen and filter cartridges each equipped with a safety by-pass valve.

A still further object of the invention is to provide a filter unit wherein a container removably supports a plurality of upstanding cartridges, at least some of which contain absorbent filter media, and wherein the pressure drop through each cartridge is so correlated to insure continued filtration through all of the units.

Other and further objects of the invention will be apparent to those skilled in the art from the following detailed description of the annexed sheet of drawings which, by way of a preferred example only, illustrates one embodiment of the invention.

On the drawings:

Figure 1 is a vertical cross sectional view, with parts in side elevation, of a filter unit according to this invention.

Figure 2 is a transverse horizontal cross sectional view taken along the line II—II of Fig. 1.

As shown on the drawings:

In Fig. 1 the filter unit 10 is composed of a metal container or can 11 having a cylindrical side wall 11a, a flat bottom wall 11b and an open top with a metal ring 12 secured therearound. A flat circular plate 13 is mounted in the container 11 above the bottom wall 11b to provide a false bottom in the container. The container is thereby divided into a top compartment 14 and a bottom compartment 15. An inlet 16 is provided in the side wall 11a of the container to supply fluid to the main compartment 14. An outlet 17 is provided in the side wall of the container beneath the false bottom 13 to drain the bottom compartment 15.

A plurality of tube stubs or nipples 18 are secured in the false bottom 13 and extend thereabove into the main compartment 14. These nipples 18 define passageways connecting the main compartment 14 with the bottom compartment 15. The unit 10 has one nipple 18 for each screen and filter cartridge therein. Any number of cartridges may be used although it is preferable to have a plurality of filter cartridges for each screen cartridge. As shown on the drawings one nipple 18 is mounted on the center of the false bottom 13 and is surrounded by four equally spaced nipples, making a total of five carried by the false bottom.

Each nipple 18 has a shoulder 18a thereon disposed at a level slightly above the false bottom 13. A screen cartridge 19 is seated on the shoulder 18a of the center nipple 18. Filter cartridges 20 are seated on the shoulders 18a of the nipples 18 surrounding the center nipple.

The screen cartridge 19 is composed of a circular bottom head 21 with a central depending collar 21a adapted to fit around the upper end of the nipple 18 and seat on the shoulder 18a of the nipple. The head 21 has an upturned peripheral flange 21b receiving therein a cylindrical screen 22. A perforated tube 23 fits in the collar 21a of the head 21 and around the upper end of the nipple 18. A shoulder 21c in the collar 21a underlies the tube 23. The tube 23 projects through the axial central portion of the cylindrical screen 22.

A top head 24 has a depending cylindrical flange or collar 24a receiving the upper end of the tube 23 and a depending peripheral flange 24b receiving the upper end of the cylindrical screen 22. The top head 24 and the bottom head 21 cooperate to hold the cylindrical screen and the perforated tube in spaced concentric relation thereby providing a filter space within the screen and around the tube. The tube has perforations 23a at selected levels up to an inwardly pinched portion 23b near the top of the cartridge. This portion 23b forms an internal shoulder in the tube receiving a ring 25 which supports a coil spring 26. The coil spring extends upwardly from the ring 25 to the upper end of the tube. This upper end of the tube is threaded and receives a head or cap 27 in threaded relation therein. The cap 27 has an open bottomed central passageway 27a with side ports 27b above the head 24. A nipple portion 27c projects from the central portion of the top of the cap and a shoulder 27d surrounds the nipple portion.

A ball 28 is seated in the end of the spring 26 and is pressed by the spring against the lower open bottom end of the passageway 27a thereby closing the passageway. The spring is loaded to exert a predetermined pressure on the ball so that the ball will be unseated to open the passageway 27a only when pressure in the passageway exceeds the spring load.

The filter cartridges 20 are of identical construction and only one will be described. Each unit 20 has a bottom head 29 with a depending cylindrical collar or flange 29a embracing the nipple 18 and bottomed on the shoulder 18a thereof and with an upstanding peripheral flange 29b receiving a cylindrical screen 30 therein. A second generally circular head member 31 is seated on the head 29 around an upstanding perforated tube 32 carried on the shoulder 29c of the collar 29a. The head 31 is of smaller diameter than head 29 and, may be welded, brazed or soldered to the head 29. Head 31 has an upstanding peripheral flange 31a surrounding the tube 32 and spaced therefrom. The concentric heads 29 and 31 thus have peripheral flanges 29b and 31a, with the flange 29b surrounding both the flange 31a and the screen 30. A second cylindrical screen 33 is seated within the flange 31a and is secured to the head 31 by soldering, welding or the like. The heads 29 and 31 hold the cylindrical screens 30 and 33 and the tube 32 in spaced concentric relation.

The upper end of each unit 20 has a top head 34 with a downturned collar or flange portion 34a surrounding the upper end of the tube 32 and with a peripheral flange 34b receiving the upper end of the large diameter or outer screen 30. A second top head 35 is fixedly mounted on the tube 32 and has a peripheral flange 35a spaced inwardly from the flange 34b and receiving the upper end of the screen 33 therein. The head 35 can be brazed, soldered or welded to tube 32 and of course the screens 30 and 33 are respectively secured to the heads 34 and 35.

The upper end of the tube 32 is internally threaded and receives the same type of ported cap or plug 27 as is used on the tube 23. A spring pressed relief valve identical with the one provided in the tube 23 is also provided in the tube 32 to control flow of fluid directly into the tube.

A plate 36 is slidably mounted in the container 11 and has apertures therethrough receiving the nipples 27c of the cap members 27. The plate rests on the shoulders of these cap members.

A cover or lid 37 is mounted on top of the container 11 on the ring 12 thereof. Swing bolts 38 carried on pins 39 in ears 12a of the ring 12 fit into slots 40 in the periphery of the cover 38 and nuts 41 on the swing bolts 39 tighten the cover into sealed engagement with the top of the container. A spring 42 is interposed between the cover and the plate 36 to spring press the plate downwardly toward the bottom of the container. This spring pressure on the plate causes the plate to urge the caps 27 toward the bottom of the container thereby holding the cartridges 19 and 20 on the nipples 18.

The filter cartridges 20 are filled with absorbent filtering material 43 between the screens 30 and 33. The mesh of these screens is just sufficient to retain the filter media therebetween and to prevent lint from the media from passing through the inner screen. The inner screen is spaced from the tube 32 so that fluid flowing through the filter media and through the inner screen can enter this space to flow through the perforations in this inner tube.

In operation of the device, fluid to be filtered enters the inlet 16 to fill the main compartment 14 of the container 11. Some of the fluid flows through the screen cartridge 19 while the remaining fluid flows through the filter cartridges 20. The mesh of the screen in the screen cartridge 19 is sized relative to the resistance to flow through the filter cartridges so that the same pressure drop will exist through all of the cartridges.

The absorbent material 43 in the filter cartridges dries the fluid and also filters out fine slimes and sludges. The screen 22 of the screen cartridge 19 screens out foreign bodies. The filtered and screened fluid enters the perforated tubes in the centers of the cartridges and flows by gravity down through the nipples 18 into the bottom compartment 15 from which it is removed out of the outlet 17.

As the filter units and screen unit become clogged, pressure in the compartment 14 will build up until it exceeds the spring loads on the relief valves or balls 28. The balls are then unseated from the caps 27 and by-passes are opened up directly connecting the main compartment 14 with the interior of the tubes 23 and 32 for flow of fluid through the unit. Of course when fluid is being by-passed, the filter and the screen cartridges should be replaced or cleaned. In order to replace these cartridges it is merely necessary to remove the cover 37, lift off the plate 36, and lift the cartridges off of the nipples 18.

From the above description it will be clear that a unitary filter device has been provided to simultaneously screen one portion of fluid passing therethrough while the remaining portion is being filtered through absorbent material. It will also be understood that the unit includes replaceable cartridges and has by-pass valves adapted to open whenever pressure in the unit exceeds a predetermined selected amount.

The single unit of this invention replaces the heretofore necessary separate screen and by-pass filter units.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A combination full flow and by-pass filter unit which comprises a container having a false bottom therein dividing the container into top and bottom compartments, said false bottom carrying a plurality of nipples connecting said compartments, an inlet for introducing liquid under pressure into said top compartment, an outlet for removing liquid from said bottom compartment, a screen cartridge replaceably mounted on one of said nipples, filter cartridges replaceably mounted on the other of said nipples, each of said cartridges including an inner perforated tube and an outer screen, said filter cartridges including in addition an inner screen surrounding the tube and absorbent filter material between the screens, each tube having an apertured closure on its upper end communicating with the interior of said tube through a bore, a relief valve resiliently closing said bore against fluid pressure in said top compartment and adapted to open under excessive fluid pressure to permit fluid flow through said closures and said tubes thus by-passing fluid from the top compartment around said screen and filter cartridges into the lower compartment, a plate in said container apertured to receive the tops of said apertured closures of said cartridges to hold said cartridges on said nipples, a cover for said container, and a spring confined between said plate and said cover to urge said plate against said closures.

2. A unitary screen and filter device comprising a container having a false bottom above the main bottom thereof dividing the container into upper and lower compartments, an inlet for said upper compartment, an outlet for said lower compartment, a plurality of removable filter units in said top compartments having interior outlets communicating with the bottom compartment, a single screen unit in said top compartment having an interior outlet communicating with said bottom compartment, a cap seated on at least one of said units having an apertured end extending into the upper chamber and an open end extending into the interior outlet of said unit to provide communication between said upper and lower compartments through said interior outlet, and valve means resiliently closing the open end of said cap and adapted to open whenever pressure in the top compartment exceeds a predetermined amount to by-pass said filter and screen units.

3. A combination filter and screen device comprising an open top container, a wall in said container spaced above the bottom thereof dividing the container into top and bottom compartments, said top compartment having an inlet, said bottom compartment having an outlet, a plurality of nipples mounted on said wall in said container projecting into the top compartment and defining passageways therethrough joining the compartments, said nipples having mounting shoulders therearound, a screen unit having an interior perforated pipe and an exterior cylindrical screen together with end heads connecting the pipe and screen, a plurality of filter units each having an interior perforated pipe, an inner screen surrounding the pipe, an outer screen radially spaced from the inner screen and absorbent filter material between the screens, together with end heads connecting the screens and pipe, one end head of each unit being seated on said shoulders of said nipples, the other end head of each unit having a ported cap associated therewith with a passageway therethrough connecting the top compartment with the interior of the pipe, and a spring pressed relief valve in the upper end of each pipe closing the passageway of the ported cap but adapted to be opened whenever pressure in the top compartment exceeds the spring load on the valve.

4. A filter unit comprising a cylindrical container having an open top and a closed bottom, a false bottom in said container above the bottom thereof dividing the container into top and bottom compartments, said false bottom having a plurality of hollow nipples mounted thereon and providing passageways joining said compartments, an inlet for said top compartment, an outlet for said bottom compartment, an upstanding perforated tube mounted on each nipple and extending through the top compartment to the top of the container, a cylindrical screen surrounding one of said tubes, imperforate end heads joining the cylindrical screen with said one tube, a pair of spaced concentric screens surrounding each of the other tubes, absorbent filter material between said spaced concentric screens, end heads supporting said screens and tubes in spaced concentric relation, each of said tubes having end caps thereon providing shoulders at a level in the container above the screens, a cover for the open top of said container, a plate in said container seated on the shoulders of said caps, and a spring between the cover and plate urging the plate downwardly in the container to hold the screen and filter units on the nipples.

5. A unitary screen and filter device comprising a container having a false bottom above the main bottom thereof dividing the container into upper and lower compartments, an inlet for said upper compartment, an outlet for said lower compartment, a plurality of removable filter units mounted in said upper compartment, each filter unit having an interior perforated pipe communicating with the bottom compartment, concentric cylindrical screens surrounding said perforated pipe and absorbent filtering material confined between said screens, a screen unit, said screen unit having an interior perforated pipe in communication with said bottom compartment and a single cylindrical screen surrounding said pipe, the single screen of said screen unit being of such mesh that the resistance of flow through said screen unit is equal to resistance of flow through each of said filter units so that the same pressure drop exists through all of said units, a cap seated on at least one of said units having an apertured end extending into said upper chamber and an open end extending into the interior pipe of said unit to provide communication between said upper and lower chambers through said perforated pipe and valve means resiliently closing the open end of said cap and adapted to open whenever the pressure in the top compartment exceeds a predetermined amount to by-pass said filter units and said screen unit.

6. In a screening and filtering device including a container having an upper and lower compartment, an inlet for the upper compartment and an outlet for the lower compartment, the improvement which comprises a single screening unit extending axially of the upper compartment and including an inner perforated pipe in communication with the bottom compartment and a single cylindrical screen surrounding said pipe, and a plurality of filter units mounted in said upper compartment in spaced relation to said screening unit, each filter unit including an interior perforated pipe communicating with the bottom compartment, concentric cylindrical screens surrounding said interior perforated pipe and absorbent filtering material confined between said screens, and the single screen of said screening unit being of such mesh that the resistance of flow through said single screening unit is equal to resistance of flow through said filter units so that the same pressure drop exists through all of said units.

FRANK LEE TOWNSEND.

REFERENCES CITED

The following references are of record in the file of this patent:

UNITED STATES PATENTS

| Number | Name | Date |
|---|---|---|
| 930,401 | Monteagle | Aug. 10, 1909 |
| 2,352,732 | Nugent | July 4, 1944 |

FOREIGN PATENTS

| Number | Country | Date |
|---|---|---|
| 318,646 | France | Oct. 22, 1902 |